United States Patent [19]

Ueno

[11] Patent Number: 4,864,412

[45] Date of Patent: Sep. 5, 1989

[54] COMMUNICATION SYSTEM

[75] Inventor: Yasuhide Ueno, Tokyo, Japan

[73] Assignee: Canon Kabushiki Kaisha, Tokyo, Japan

[21] Appl. No.: 291,345

[22] Filed: Dec. 29, 1988

Related U.S. Application Data

[63] Continuation of Ser. No. 684,119, Dec. 20, 1984, abandoned.

[30] Foreign Application Priority Data

Dec. 22, 1983 [JP] Japan ................................ 58-240946

[51] Int. Cl.$^4$ ............................................. H04N 1/22
[52] U.S. Cl. .................................. 358/436; 358/443; 358/494; 379/100
[58] Field of Search ............... 358/257, 256, 293, 280; 379/100

[56] References Cited

U.S. PATENT DOCUMENTS

| | | | |
|---|---|---|---|
| 3,962,534 | 6/1976 | Ogawa | 358/257 |
| 4,353,097 | 10/1982 | Takeda et al. | 358/257 |
| 4,736,249 | 4/1988 | Iizuka | 358/257 |

Primary Examiner—Edward L. Coles, Sr.
Attorney, Agent, or Firm—Fitzpatrick, Cella, Harper & Scinto

[57] ABSTRACT

A communication system for communicating data such as image data has a transmitter and a receiver connected through a communication line. Each transmitter or receiver has an NCU, a modem, a control unit, a reader, a recorder, and a console unit. A sound output unit for producing a sound representing the state of a received image (the number of errors in the received image data) can be included in the transmitter or the receiver. After an operator at the transmitter sends data, the operator is called and can hear a sound message representing the state of the data received by the receiver.

18 Claims, 5 Drawing Sheets

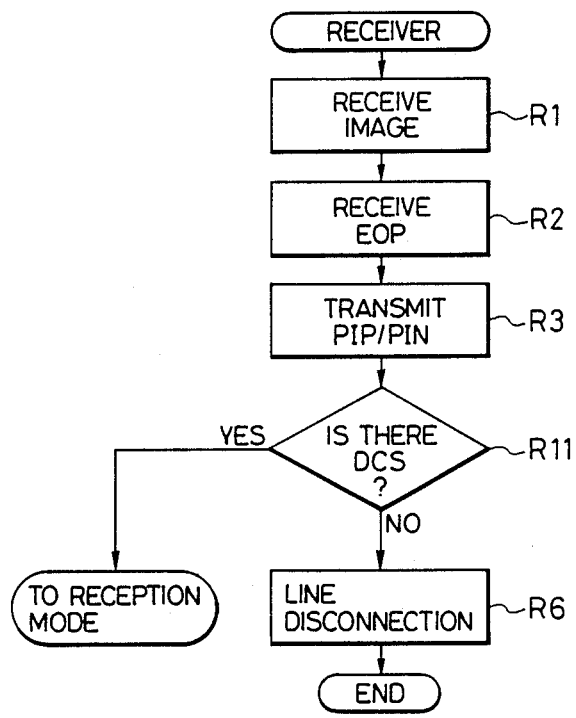

COMMUNICATION SYSTEM

This application is a continuation of application Ser. No. 684,119 filed Dec. 20, 1984 now abandoned.

BACKGROUND OF THE INVENTION

1. Field of the Invention

The present invention relates to a communication system for communicating information such as image information through a communication line.

2. Brief Description of the Prior Art

In a conventional facsimile system, the state of an image received and reproduced by a receiving facsimile system is discriminated by a transmitting facsimile system in accordance with a response signal such as an MCF (Message Confirmation) signal sent by the receiving facsimile system after transmitting the image. When the received image is not good, an error indication is displayed and communication is terminated while, when the image is good, communication is continued. In this manner, in a conventional system, an operator at a sending side cannot directly confirm the state of an image being received and reproduced at a receiving side. Therefore, an untrained operator may be concerned whether the image being sent is being normally received and reproduced.

SUMMARY OF THE INVENTION

It is an object of the present invention to provide a communication system which is free from the conventional drawbacks and which allows an operator at a sending side to easily confirm if communication information is being normally received at a receiving side.

It is another object of the present invention to provide a facsimile communication system which allows an operator at the sending side to confirm by sound or speech if an image being received and reproduced at the receiving side is good.

The above and other objects, features and advantages of the present invention will become apparent from the following description when taken in conjunction with the accompanying drawings.

BRIEF DESCRIPTION OF THE DRAWINGS

FIGS. 5A and 5B are flow charts of a control sequence in communication according to a second embodiment of the present invention.

DETAILED DESCRIPTION OF THE PREFERRED EMBODIMENTS

The preferred embodiments of the present invention will now be described with reference to the accompanying drawings.

Figure 1:
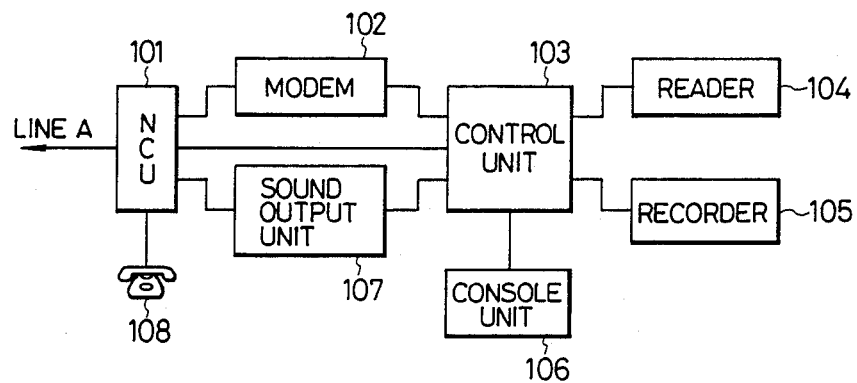
FIG. 1 is a block diagram showing the configuration of a facsimile system according to an embodiment of the present invention.

FIG. 1 shows the configuration of a transmitting-/receiving facsimile system according to the present invention. A network control unit (to be referred to as an NCU hereinafter) 101 switches connection of a line A between a facsimile system including a modem 102 and a telephone set 108. The NCU 101 is also connected to a sound output unit 107 and a control unit 103 consisting of a microcomputer, memory elements and the like.

The control unit 103 controls the overall system in accordance with a predetermined program. The control unit 103 is connected to a reader 104 comprising a CCD sensor or the like for reading an image to be transmitted, and to a recorder 105 comprising a thermal printer or the like for recording a received image.

A console unit 106 is also connected to the control unit 103 to allow input operation by means of various switches and keys. Although not shown in detail, an operator calling unit such as a bell sound generator is included.

The above configuration is the same as that of a conventional facsimile system. However, in the embodiment of the present invention, data representing the state of an image is returned to a transmitter by the sound output unit 107 through the NCU 101.

The operation of the system described above will be described in detail with reference to FIGS. 2 and 3A and 3B. In the description to follow, G3 (group 3) communication is performed in accordance with T4 Recommendation of CCITT. The communication procedures conform to CCITT Recommendation T30.

Figure 2:
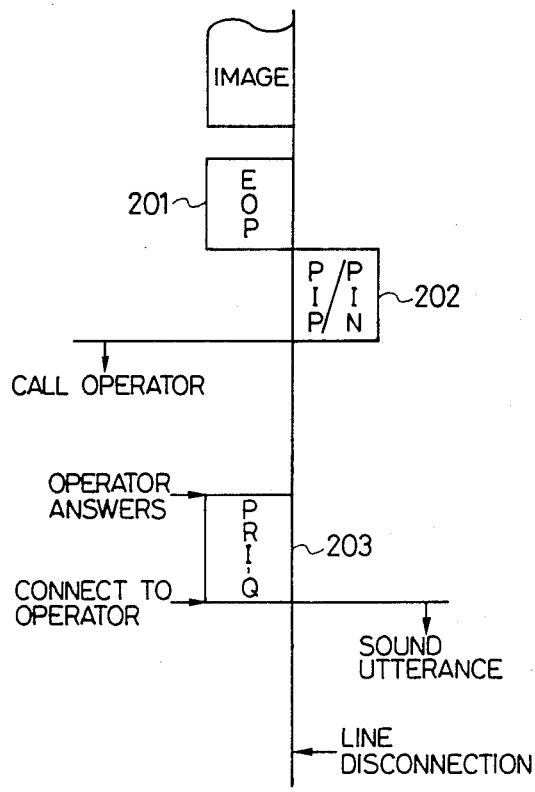
FIG. 2 is a representation showing the communication sequence in accordance with the embodiment shown in FIG. 1.
Figure 3A:
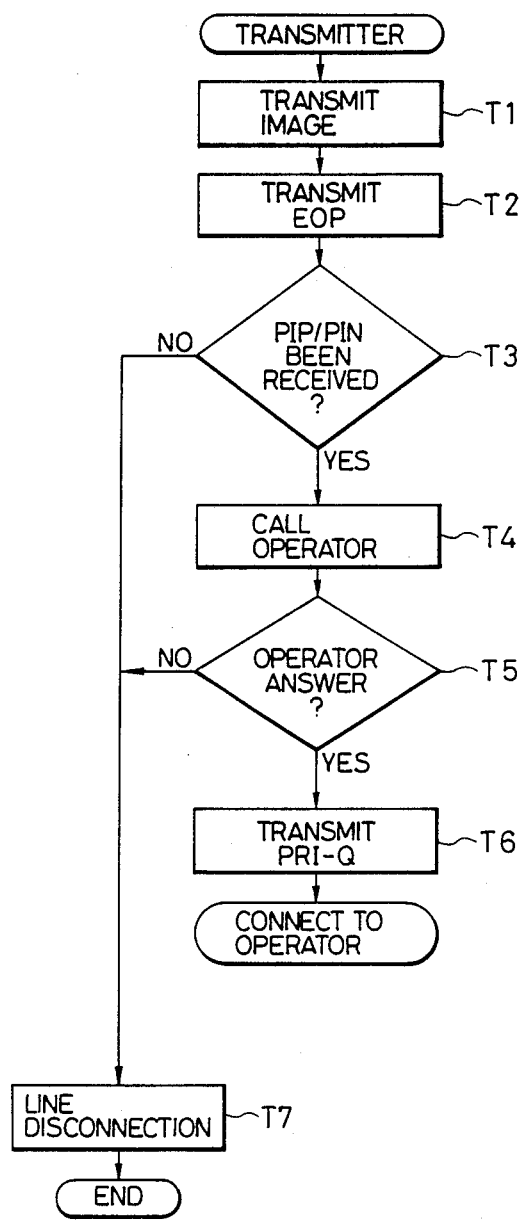
FIGS. 3A and 3B are flow charts showing a control sequence of the embodiment shown in FIG. 1.
Figure 3B:
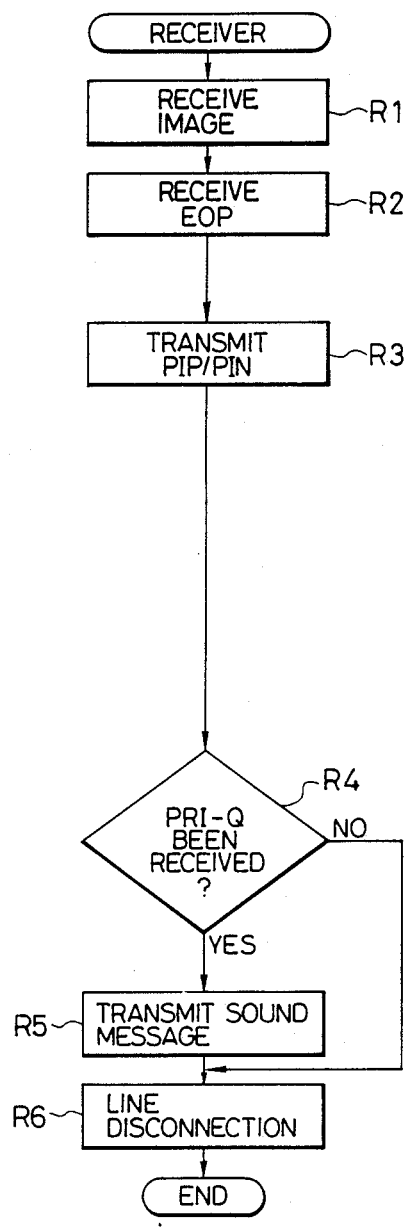

FIG. 2 is a representation showing a signal exchange between the transmitter and the receiver. The procedures from calling to image transmission are the same as those in a conventional system and are therefore omitted.

After sending all image read signals, the transmitter sends an EOP (End of Procedure) signal 201. FIGS. 3A and 3B show the control sequence of the control units 103 of the transmitter and receiver, respectively. Transmission/reception of an image is illustrated as steps T1 and R1, respectively. Transmission/reception of the EOP signal is illustrated as steps T2 and R2, respectively.

Upon receiving the signal 201, the receiver sends a PIP/PIN (Retrain positive or retrain negative) signal 202 in step R3. A PIP signal requests an operator call and also represents normal reception of the image. A PIN signal requests the operator call and also represents incomplete reception of the image. In step T3, the transmitter awaits reception of the PIP/PIN signal. When the PIP/PIN signal is not received, the transmitter disconnects the line in step T7 and ends communication.

When the PIP/PIN signal 202 is received in step T3 as shown in FIG. 2, the operator call is performed by means of a bell-like sound or other conventional method in step T4.

In step T5, a response of the operator to the operator call is awaited. When the operator does not answer the operator call in step T5, the flow advances to step T7. However, when the operator answers the operator call by depressing a known telephone button or the like, the flow advances to step T6. In step T6, the transmitter sends a PRI-Q (post message instruction) signal 203 to signal the receiver that the operator has answered the operator call.

Meanwhile, the receiver awaits reception of the signal PRI-Q in step R4. When the signal PRI-Q is not received, the flow advances to step R6. In step R6, the line is disconnected and communication ends.

At the transmitter side, after step T6, the line A is connected to the telephone set 108 by the NCU 101.

At the receiver side, the flow advances from step R4 to R5. In step R5, a sound message is transmitted in accordance with the state of the reproduced image. When the image is good, a sound or speech message "Image is good" is returned to the transmitter by the sound output unit 107 through the NCU 101 and the line A. When the sound output unit 107 comprises a speech synthesizer or the like, this message is recorded in a memory. When the sound output unit 107 comprises a tape recorder, the message is recorded on magnetic tape. Messages representing various states of the reproduced images are preferably stored in accordance with varying degrees of problems in the state of the image.

Figure 4:
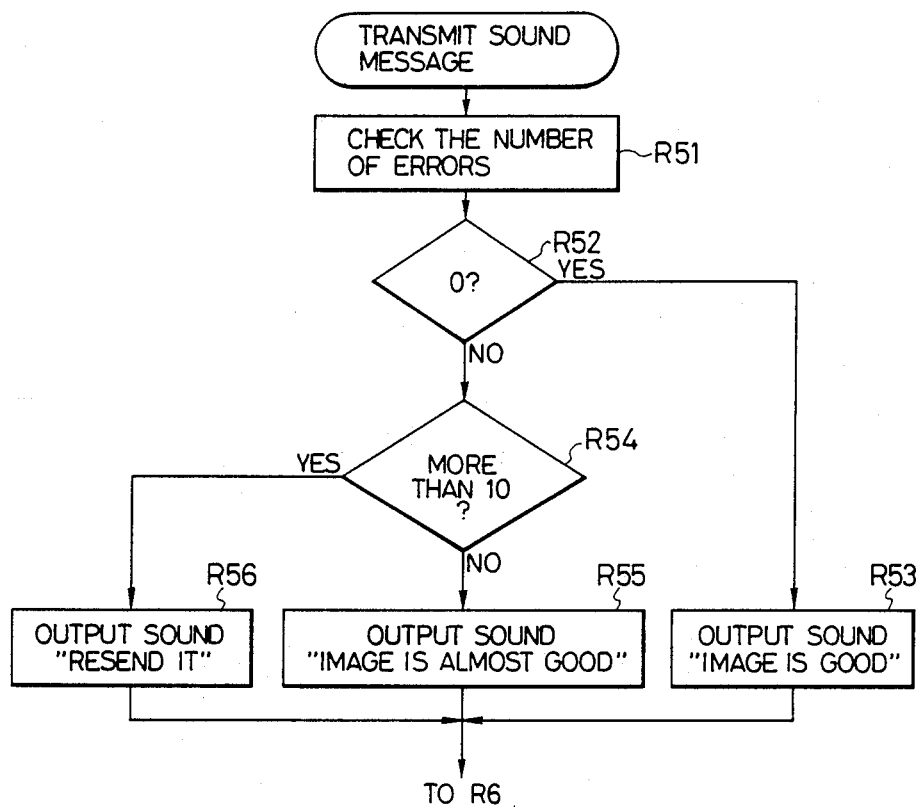
FIG. 4 is a flow chart showing in more detail a portion of the content of the flow chart shown in FIG. 3B.

An example of processing in step R5 will be described with reference to FIG. 4. The control unit 103 counts the number of errors in a received image during image reception and holds the counted number of errors in a memory. In step R51, the number of errors is checked. If the number is 0, a sound "Image is good" is produced. However, if the number of errors falls within a range between 1 (inclusive) and 10 (exclusive), a sound "Image is almost good" is produced. If the number is 10 or more, an output sound "Resend it" is transmitted to the transmitter and the receiver is set in the standby-mode.

At the transmitter side, the sound message from the receiver is heard by the operator through a handset. Thus, the operator can confidently confirm if the image sent was received normally or not.

At the receiver side, after a sound message is transmitted, the flow advances to step R6. In step R6, the line is disconnected and communication ends.

The above embodiment is exemplified with reference to a case wherein the sound output unit 107 is incorporated in the receiver. However, a description of a second embodiment will be made below wherein the sound output unit 107 is incorporated in the transmitter.

A control block in this case can be the same as that in FIG. 1. However, an NCU 101 can connect an output from a sound output unit 107 to a telephone set 108.

Figure 5A:
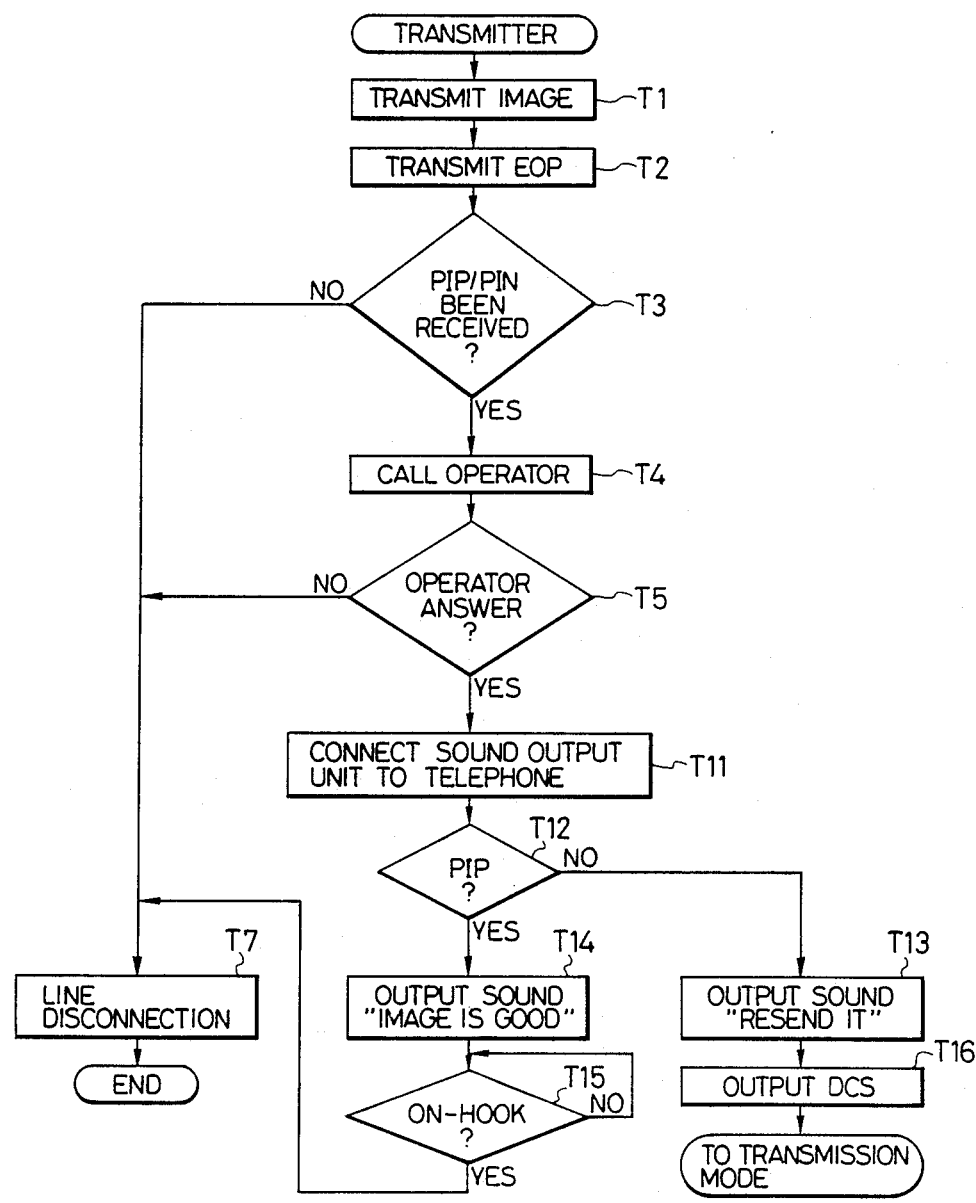

FIGS. 5A and 5B show a control flow chart according to the second embodiment. Referring to FIG. 5, steps with the same numbers as in FIG. 3 have the same functions.

When an operator answers an operator call, the NCU 101 of the transmitter connects the sound output unit 107 and the telephone set 108 in step T11.

It is checked if a signal received in step T3 is a PIP or PIN signal. When it is determined that the PIP signal is received, the image signal has been completely received by the receiver. Therefore, the control unit 103 instructs the sound output unit 107 to produce a sound message "Image is good" in step T14 and the operator hears this sound. Thereafter, when the operator hangs up the telephone, the line is disconnected in step T17.

If the received signal is the PIN signal, it indicates that the receiver has received the image incompletely. Therefore, the control unit 103 instructs the sound output unit 107 to produce a sound message "Resend it" in step T13. Thereafter, in step T16, the transmitter sends a DCS (digital command signal) to the receiver and is set in the transmission mode.

Meanwhile, when the DCS signal is received at the receiver in step R11, the receiver is set in the reception mode. When the image is normally received, the line is disconnected in step R6.

In this manner, the state of a received image can be signalled to the operator at the transmitter side through the sound output unit in accordance with information returned from the receiver.

In the first and second embodiments described above, the state of a received image can be signalled to the operator at the transmitter side by slightly modifying the sound output unit and software.

Especially in the case of the first embodiment, the state of the received image can be discriminated in accordance with a sound received from the receiver, so that the operator at the transmitter side can operate the system with confidence.

In the embodiments described above, an example of image communication is described. However, a similar operation can be performed in case of communication of other data such as character data.

As can be seen from the above description, according to the present invention, an operator at a transmitter side is called when transmisssion/reception of an image or the like is completed and a message representing the state of the received image is transmitted to the operator. Thus, the present invention provides a reliable and inexpensive communication system which even an unskilled operator can operate with confidence. The present invention is not limited to the embodiments described above, and various changes and modifications can be made within the spirit and scope of the present invention.

I claim:

1. A data receiving apparatus comprising:
   means for receiving data from a transmitter apparatus;
   first detection means for detecting an end signal representing the end of the data from the transmitter apparatus;
   means for transmitting an operator call request signal to the transmitter apparatus in response to detection of the end signal;
   second detection means for detecting an answer signal transmitted by the transmitter apparatus in response to the operator call request signal; and
   informing means for informing the transmitter apparatus of a receiving state of the received data in response to detection of the answer signal.

2. An apparatus according to claim 1, wherein said informing means informs the receiving state of the received data via a sound message.

3. An apparatus according to claim 1, wherein said informing means informs the receiving state of the received data via a signal indicating the state.

4. An apparatus according to claim 1, wherein the data from the transmitter apparatus comprises image data.

5. An apparatus according to claim 1, wherein communication between said apparatus and the transmitter apparatus is terminated if said second detection means detects no answer signal.

6. An apparatus according to claim 1, wherein said apparatus again performs data reception in the event that a signal indicating further data transmission is received from the transmitter apparatus after said informing means has informed the receiving state.

7. A data transmission apparatus comprising:
   first transmission means for transmitting data to a destination apparatus;

second transmission means for transmitting an end signal representing the end of the data transmitted to the destination apparatus;

first reception means for receiving an operator call request signal from the destination apparatus;

operator calling means for making a call to an operator in response to the operator call request signal;

detecting means for detecting an answer by the operator to the call by said operator calling means;

second reception means for receiving a signal indicating a receiving state of the received data from the destination apparatus; and informing means for informing the operator of the receiving state in response to the detection of the operator s answer by said detecting means and to the signal received by said second reception means.

8. An apparatus according to claim 7, wherein said informing means comprises sound output means for outputting a sound representing the receiving state.

9. An apparatus according to claim 8, wherein the signal received by said second reception means is a sound signal which is output by said sound output means.

10. An apparatus according to claim 8, wherein said informing means comprises means for discriminating the signal received by said second reception means and wherein said sound output means outputs the sound in accordance with a discrimination by said discrimination means.

11. An apparatus according to claim 7, wherein the data transmitted by said first transmission means is image data.

12. A communication system having a transmitter and a receiver, comprising:

first transmitting means for transmitting data from said transmitter to said receiver;

reception means for receiving the data from said transmitter;

second transmitting means for transmitting an end signal representing the end of the data from said transmitter to said receiver;

third transmitting means for transmitting an operator call request signal from said receiver to said transmitter in response to the end signal;

calling means for making a call to an operator at said transmitter in response to the operator call request signal;

detection means for detecting an answer by the operator to the call;

fourth transmitting means for transmitting a signal indicating a receiving state of the received data from said receiver to said transmitter; and informing means for informing the operator at said transmitter, of the receiving state in response to detection of the operator s answer by said detection means and to the signal transmitted by said fourth transmitting means.

13. A system according to claim 12, wherein said informing means comprises sound output means for outputting a sound representing the receiving state.

14. A system according to claim 13, wherein the signal transmitted by said fourth transmitting means is a sound signal which is output by said sound output means.

15. A system according to claim 13, wherein said informing means comprises means for discriminating the signal transmitted by said fourth transmitting means, and wherein said sound output means outputs the sound in accordance with a discrimination by said discrimination means.

16. A system according to claim 12, wherein the data transmitted by said first transmitting means is image data.

17. A system according to claim 15, wherein said discrimination means discriminates the degree of quality of the data received by said reception means.

18. A system according to claim 17, wherein said sound output means outputs a sound representing the degree of quality of the received data in accordance with the discrimination by said discrimination means.

* * * * *

UNITED STATES PATENT AND TRADEMARK OFFICE
CERTIFICATE OF CORRECTION

PATENT NO. : 4,864,412

DATED : September 5, 1989

INVENTOR(S) : YASUHIDE UENO

It is certified that error appears in the above-identified patent and that said Letters Patent is hereby corrected as shown below: Title page:

AT [56] REFERENCES CITED

Foreign Patent Documents,
        insert --5646362  4/81  Japan.--.
        --3,444,315  5/69  Shimabukuro......358/257-- and
        --4,112,467  9/78  Ogawa......358/257--.

Column 6

Line 17, "operator s" should read --operator's--.

COLUMN 6

Line 16, "transmitter," should read --transmitter--.
    Line 17, "operator s" should read --operator's--.

Signed and Sealed this

Thirteenth Day of October, 1992

Attest:

DOUGLAS B. COMER

*Attesting Officer*        *Acting Commissioner of Patents and Trademarks*